(12) United States Patent
Smith et al.

(10) Patent No.: US 11,911,321 B2
(45) Date of Patent: Feb. 27, 2024

(54) RAMP ASSEMBLY WITH RAISED RAMP POSITION

(71) Applicant: The Braun Corporation, Winamac, IN (US)

(72) Inventors: Adam Smith, Indianapolis, IN (US); Justin M. Kline, Westfield, IN (US)

(73) Assignee: The Braun Corporation, Winimac, IN (US)

( * ) Notice: Subject to any disclaimer, the term of this patent is extended or adjusted under 35 U.S.C. 154(b) by 0 days.

(21) Appl. No.: 17/872,093

(22) Filed: Jul. 25, 2022

(65) Prior Publication Data

US 2022/0354719 A1 Nov. 10, 2022

Related U.S. Application Data

(63) Continuation of application No. 16/918,112, filed on Jul. 1, 2020, now Pat. No. 11,413,198.

(60) Provisional application No. 62/870,089, filed on Jul. 3, 2019.

(51) Int. Cl.
*A61G 3/06* (2006.01)
*B60P 1/43* (2006.01)

(52) U.S. Cl.
CPC .............. *A61G 3/061* (2013.01); *B60P 1/431* (2013.01)

(58) Field of Classification Search
CPC ......... A61G 3/061; A61G 3/067; B60P 1/431; B60P 1/433
See application file for complete search history.

(56) References Cited

U.S. PATENT DOCUMENTS

| 5,257,894 | A | 11/1993 | Grant |
| 5,380,144 | A | 1/1995 | Smith et al. |
| 5,393,192 | A * | 2/1995 | Hall ........................ B60P 1/431 296/61 |
| 5,636,399 | A | 6/1997 | Tremblay et al. |
| 5,775,232 | A | 7/1998 | Golemis et al. |
| 5,832,555 | A | 11/1998 | Saucier et al. |
| 6,470,523 | B1 * | 10/2002 | Sardonico .............. A61G 3/061 14/71.1 |
| 6,802,095 | B1 | 10/2004 | Whitmarsh et al. |
| 7,052,227 | B2 * | 5/2006 | Navarro .................. B60P 1/431 414/537 |

(Continued)

FOREIGN PATENT DOCUMENTS

| WO | 9836723 A1 | 8/1998 |
| WO | 2009081116 A1 | 7/2009 |

OTHER PUBLICATIONS

International Search Report & Written Opinion for PCT/US2020/040420, dated Oct. 15, 2020.

(Continued)

*Primary Examiner* — Glenn F Myers
(74) *Attorney, Agent, or Firm* — Daniel Tallitsch

(57) ABSTRACT

A ramp assembly to accommodate a wheel-chaired passenger to enter or exit a motorized vehicle includes a frame, a ramp movable relative to the frame, a drive block configured to move the ramp relative to the frame, a linkage arm having a first end pivotably coupled to the drive block, a linkage panel pivotably coupled to the linkage arm and a rear end of the ramp, and an upper roller pivotably coupled to the linkage panel for rotation about a pivot axis of the linkage panel to facilitate rotation of the ramp relative to the frame.

20 Claims, 8 Drawing Sheets

(56) References Cited

U.S. PATENT DOCUMENTS

| | | |
|---|---|---|
| 7,971,891 B2 | 7/2011 | Kircher |
| 11,413,198 B2 | 8/2022 | Smith et al. |
| 2006/0245883 A1 | 11/2006 | Fontaine et al. |
| 2015/0052693 A1 | 2/2015 | Allen |
| 2017/0327022 A1 | 11/2017 | Rasekhi et al. |

OTHER PUBLICATIONS

Extended Search Report for EP Appl. No. 208347723.7, dated Jun. 14, 2023, 7 pages, European Patent Office.

\* cited by examiner

RAMP ASSEMBLY WITH RAISED RAMP POSITION

RELATED APPLICATIONS

This application is a continuation of U.S. patent application Ser. No. 16/918,112, filed on Jul. 1, 2020, which claims the benefit of U.S. Provisional Patent Application Ser. No. 62/870,089, filed Jul. 3, 2019, the disclosures of which are both hereby incorporated by reference in their entirety.

FIELD OF THE DISCLOSURE

The present application relates to a passenger vehicle for transporting one or more passengers, and more particularly to a ramp assembly movable to a raised position for accommodating ingress and egress of a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified altering or adding certain parts or structures within a vehicle to accommodate the physically limited passenger without inconveniencing other passengers or sacrificing space in the vehicle. For example, in one configuration, a van or bus is retrofitted with a ramp to enable a physically limited individual using a wheelchair to enter and exit the vehicle.

In some instances, the ramp is stored below the conventional vehicle floor and deploys to accommodate an entry and exit of the physically limited individual through a side door or entrance of the vehicle. Challenges may arise related to stowing the ramp and ensuring that the ramp is flush with the conventional vehicle floor when the ramp is deployed.

SUMMARY

In a first embodiment of this disclosure, a ramp assembly to accommodate a wheel-chaired passenger to enter or exit a motorized vehicle is disclosed. The ramp assembly includes a frame including a front end, a rear end spaced apart longitudinally from the front end, and a track system extending longitudinally between the front end and the rear end of the frame; a ramp pivotably and slidably coupled to the track system and including a front end, and a rear end; a drive block configured to translate longitudinally along the track system; a linkage arm having a first end pivotably coupled to the drive block and a second end spaced apart from the first end; a linkage panel having a first end pivotably coupled to the second end of the linkage arm for rotation about a first pivot axis of the linkage panel and a second end pivotably coupled to the rear end of the ramp; and an upper roller pivotably coupled to the linkage panel for rotation about a second pivot axis of the linkage panel that is positioned between and spaced apart from the first and second ends of the linkage panel.

In the illustrative embodiment, the track system includes a roller socket defined at the front end of the frame, and the linkage panel is configured to rotate about the second pivot axis of the linkage panel when upper roller is positioned in the roller socket to adjust the height of the ramp relative to the frame. The track system further includes a longitudinal channel extending from the rear end of the track system to a guide block, and the guide block includes a sloped surface increasing in height as the sloped surface extends between the longitudinal channel and the roller socket. The upper roller is configured to translate along the sloped surface to adjust the height of the ramp relative to the frame.

In the illustrative embodiment, the ramp assembly includes a lower roller pivotably coupled to the linkage panel for rotation about the first pivot axis of the linkage panel. The track system further includes a longitudinal channel extending from the rear end of the track system to a guide block, the guide block includes a sloped surface increasing in height as the sloped surface extends between the longitudinal channel and a roller socket configured to receive the upper roller, and the guide block includes a curved groove opening to a first portion of the sloped surface and configured to receive the lower roller. The upper roller is configured to translate along a second portion of the sloped surface adjacent to the first portion of the sloped surface as the lower roller is received in the curved groove of the guide block.

In the illustrative embodiment, the ramp is moveable between (i) a stowed position in which the ramp is positioned inside the motorized vehicle and beneath the conventional floor, (ii) a lowered position in which the ramp is positioned outside the motor vehicle and the rear end of the ramp is positioned below the conventional floor, and (iii) a raised position in which the ramp is positioned outside the motor vehicle and the rear end of the ramp is positioned flush with the conventional floor. The linkage panel defines a plane extending through the first end and the second end of the linkage panel. The drive block includes a first roller configured to rotate about a first rotational axis and a second roller configured to rotate about a second rotational axis perpendicular to the first rotational axis.

In the illustrative embodiment, the linkage arm includes a longitudinal axis extending from the first end to the second end of the linkage arm, and when the ramp is in the raised position the longitudinal axis of the linkage arm is substantially perpendicular to the plane defined by the linkage panel. When the ramp is not in the raised position the longitudinal axis of the linkage arm forms a non-orthogonal angle with the plane defined by the linkage panel.

In the illustrative embodiment, the drive block includes a first roller configured to rotate about a first rotational axis and a second roller configured to rotate about a second rotational axis perpendicular to the first rotational axis. The drive block is coupled to a conveyer belt that surrounds a pair of wheels, and rotation of the wheel rotates the conveyer belt and translates longitudinally the drive block coupled thereto along the track system.

In another embodiment of this disclosure, a ramp assembly for a motorized vehicle having a conventional floor is disclosed. The ramp assembly includes a frame including a front end, and a rear end spaced apart longitudinally from the front end, and a track system extending longitudinally between the front end and the rear end of the frame; a ramp pivotably and slidably coupled to the track system and including a front end, and a rear end; wherein the ramp is moveable between (i) a stowed position in which the ramp is positioned inside the motorized vehicle and beneath the conventional floor, (ii) a lowered position in which the ramp is positioned outside the motor vehicle and the rear end of the ramp is positioned below the conventional floor, and (iii)

a raised position in which the ramp is positioned outside the motor vehicle and the rear end of the ramp is flush with the conventional floor.

In the illustrative embodiment, the linkage panel defines a plane extending through the first end and the second end of the linkage panel, the linkage arm includes a longitudinal axis extending from the first end to the second end of the linkage arm, and when the ramp is in the raised position the longitudinal axis of the linkage arm is substantially perpendicular to the plane defined by the linkage panel. When the ramp is in the lowered position the longitudinal axis of the linkage arm forms a non-orthogonal angle with the plane defined by the linkage panel. When the ramp is in the stowed position the longitudinal axis of the linkage arm is contained in the plane defined by the linkage panel.

In the illustrative embodiment, the ramp assembly includes a drive block configured to translate longitudinally along the track system; a linkage arm having a first end pivotably coupled to the drive block and a second end spaced apart from the first end; a linkage panel having a first end pivotably coupled to the second end of linkage arm and a second end pivotably coupled to the rear end of the ramp; an upper roller coupled to the linkage panel for rotation about a pivot axis of the linkage panel. The upper roller is configured to translate longitudinally along the track system to move the ramp from the stowed position to the lowered position, the track system includes a roller socket positioned at the front end of the frame, and the roller socket is configured to receive the upper roller and retain the upper roller in a fixed location relative to the frame to move the ramp to the raised position.

In another embodiment of this disclosure, a method of moving a ramp assembly relative to a conventional floor of a motorized vehicle is disclosed. The method includes moving a ramp to a stowed position in which the ramp is positioned inside the motorized vehicle and beneath the conventional floor of the motorized vehicle; moving the ramp to a lowered position in which the ramp is positioned outside the motorized vehicle and a rear end of the ramp is positioned below the conventional floor; and moving the ramp to a raised position in which the ramp is positioned outside the motorized vehicle and the rear end of the ramp is positioned flush with the conventional floor of the motorized vehicle.

In the illustrative embodiment, moving the ramp to a raised position includes advancing a drive block toward a front end of the ramp; pivoting a first end of a linkage arm relative to the drive block; pivoting a second end of the linkage arm relative to a linkage panel; and pivoting a linkage panel relative to the ramp.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
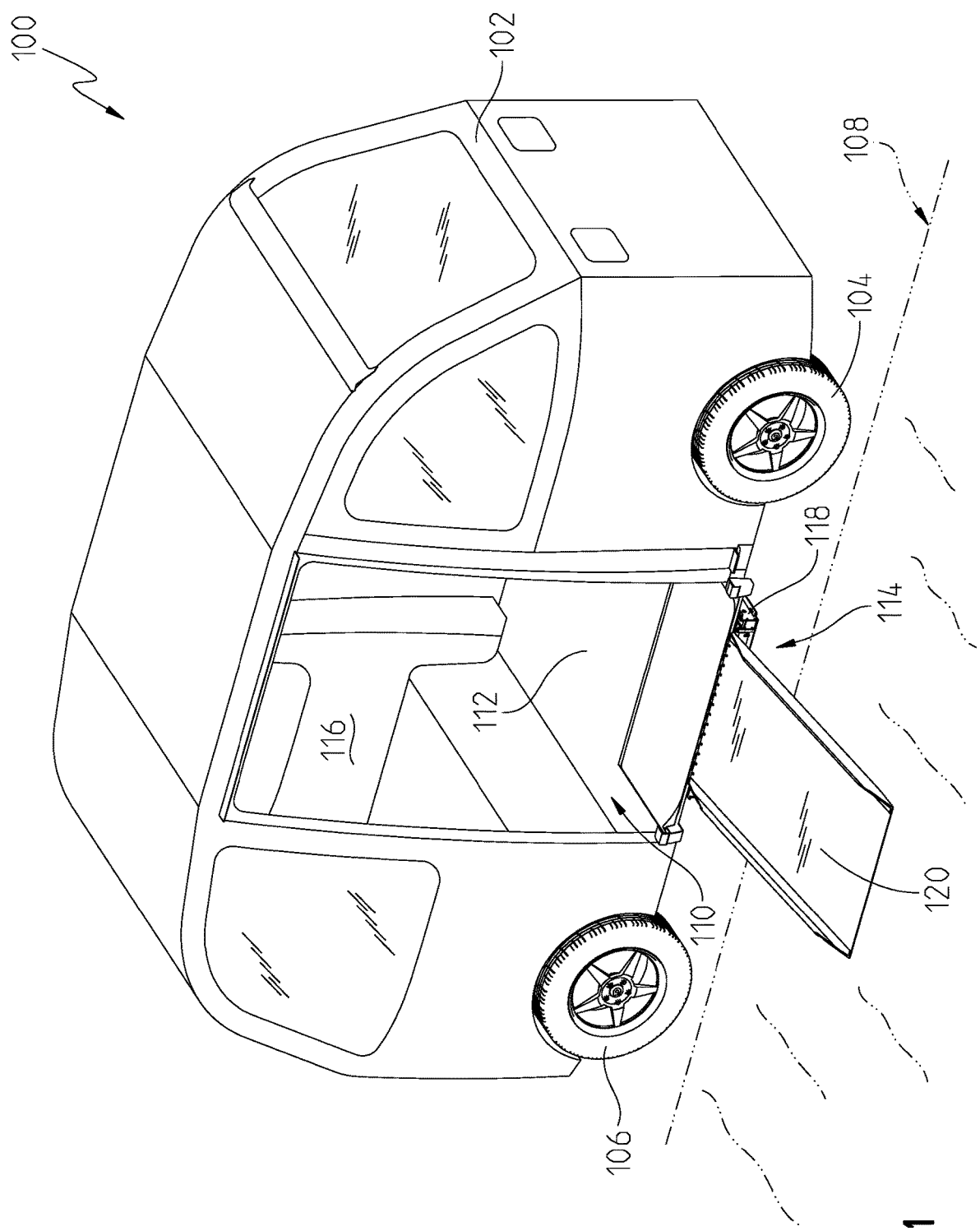
FIG. 1 is a perspective view of a passenger vehicle including a movable ramp.

FIG. 1 illustrates a vehicle 100, commonly identified as a passenger van or bus, available from any number of United States and foreign manufacturers. The vehicle may be a single-level bus, a double-decker bus, or any other type of vehicle. The principles and teachings of the present disclosure may be used for any type of vehicle.

In the illustrative embodiment shown in FIG. 1, the vehicle 100 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 100 is illustrated in FIG. 1, the present disclosure is directed to all passenger vehicles carrying one or more passengers including, but not limited to, a bus, motor coach, sport-utility vehicle, truck, taxi, ambulance, or passenger car.

The vehicle 100 includes a frame or chassis 102 operatively coupled to a first pair of wheels 104 and a second pair wheels 106 that propel the vehicle 100 along a ground surface 108. In the illustrative embodiment, the vehicle is shown as a bi-directional vehicle; however, it should be appreciated that in other examples, the vehicle may be any vehicle suitable for use with or adaptable to be used with the ramp assembly 114 described below. A first passenger opening 110 is located between the first pair wheels 104 and the second pair of wheels 106, and provides access to a passenger for sitting or standing in the vehicle 100. The passenger opening 110 may be modified to increase the size of the opening 110 to provide access, for example, to a passenger seated in a wheelchair to enter and exit the vehicle 100. The vehicle 100 may include a conventional floor 112 extending throughout the vehicle 100 to support passengers and other objects traveling in the vehicle 100.

As shown in FIG. 1, the vehicle 100 may be further modified to include the ramp assembly 114 which provides rolling access of a wheelchair from the ground surface 108 into an interior 116 of the vehicle 100. The ramp assembly 114 is positioned adjacent the opening 110 beneath the conventional floor 112 (or beneath a modified floor positioned level with the conventional floor 112) of the vehicle 100.

The ramp assembly 114 includes a frame 118, a ramp 120 movable relative to the frame 118 and a linkage assembly 122 (see in FIGS. 2A-B) coupled between the frame 118 and the ramp 120 to allow for movement of the ramp 120 relative to the frame 118. As will be described below in greater detail below, the ramp 120 is movable between several positions including a stowed position 124, a lowered position 126, and a raised position 128. As suggested by FIGS. 2A-B, in the stowed position, 124 the ramp 120 is positioned in the interior 116 the vehicle 100 and beneath the conventional floor 112. As suggested by FIGS. 3A-B, in the lowered position, 126 the ramp 120 is positioned outside the vehicle 100 and a rear end 130 of the ramp 120 is positioned below the conventional floor 112. As suggested by FIGS. 5A-B, in the raised position, 128 the ramp 120 is positioned outside the vehicle 100 and the rear end 130 of the ramp 120 is positioned flush with the conventional floor 112.

Figure 2A:
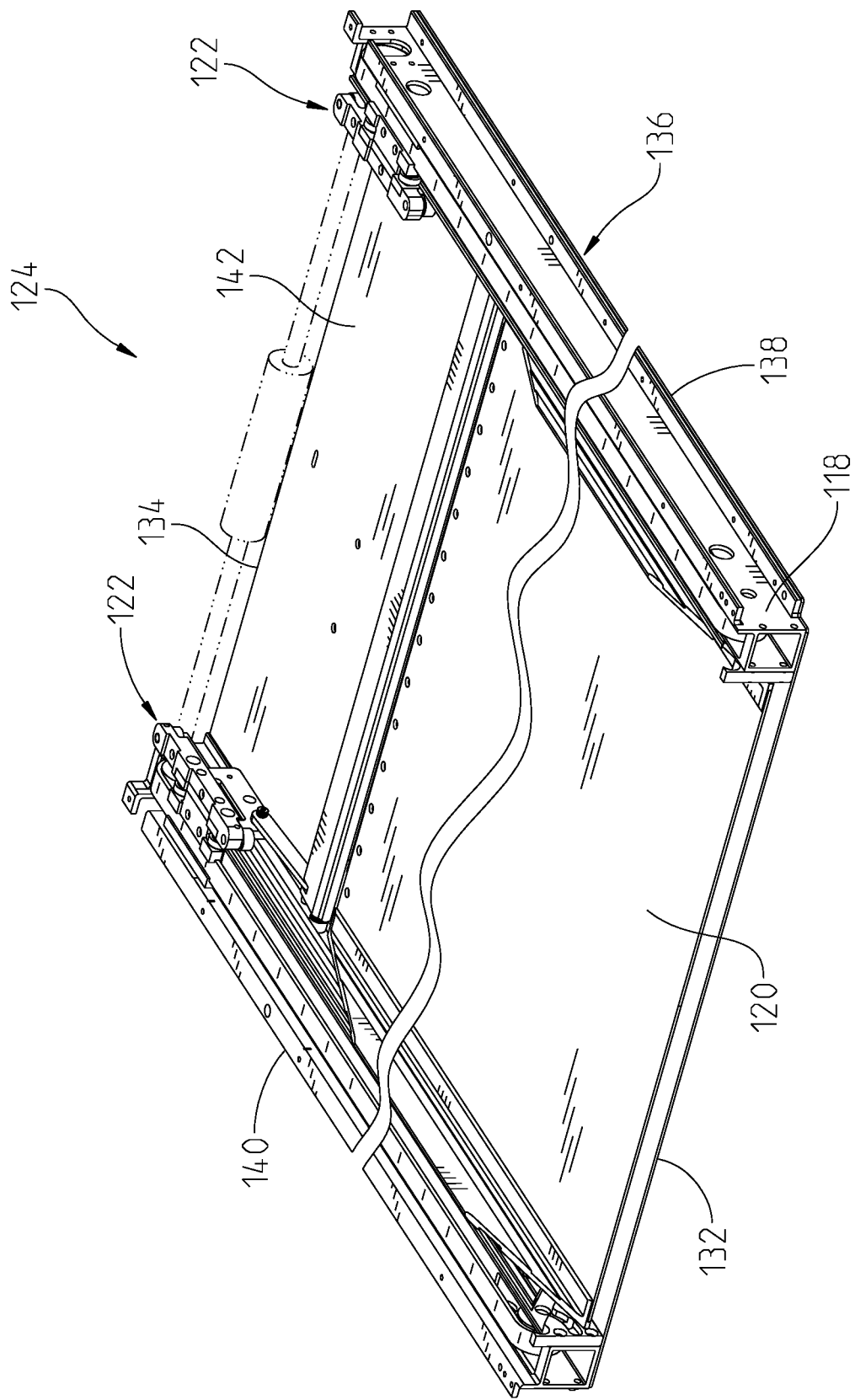
FIG. 2A is a perspective view of a ramp assembly showing a ramp in a stowed position beneath a conventional floor of the passenger vehicle.
Figure 2B:
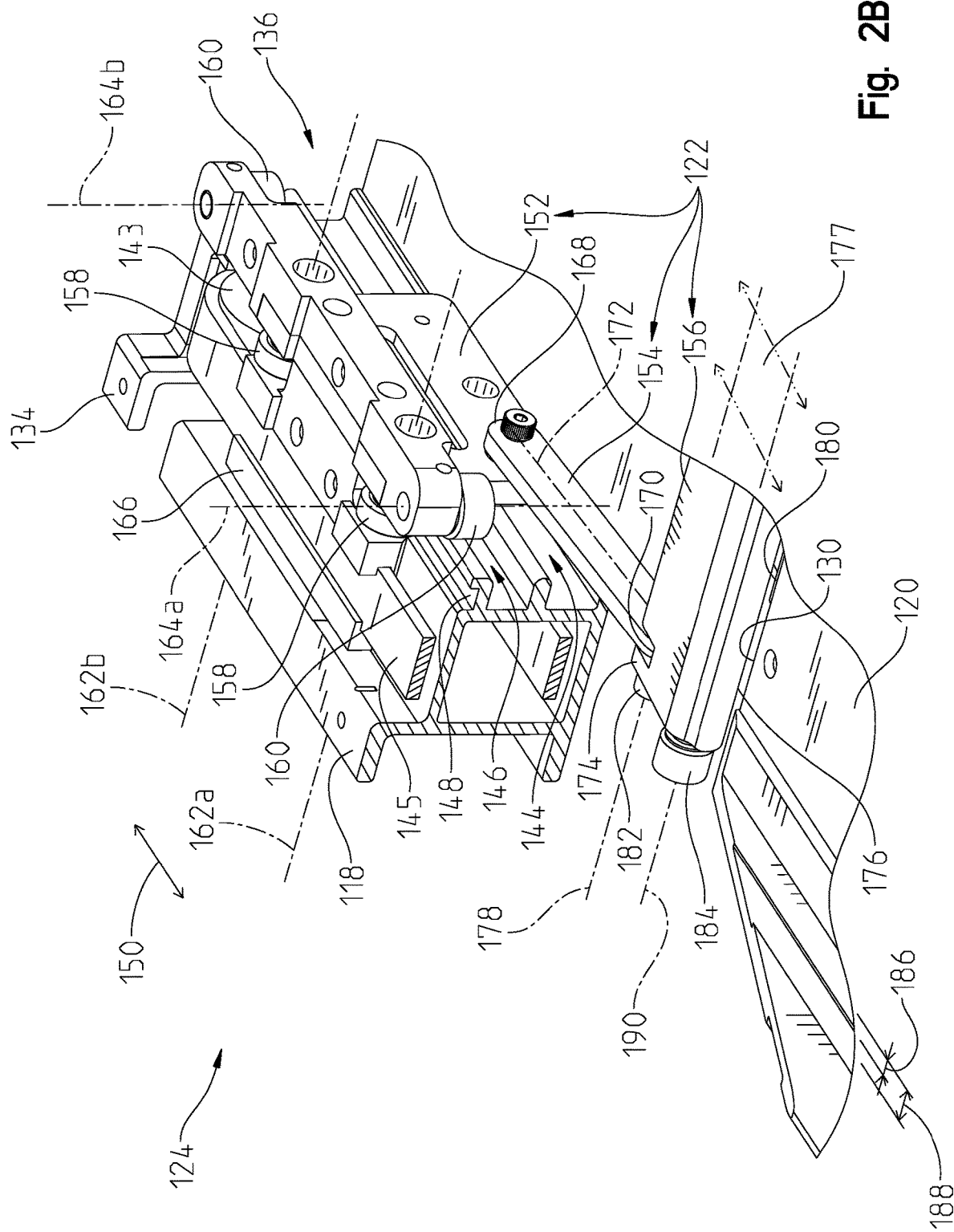
FIG. 2B is a partial cross-section view of the ramp assembly of FIG. 2A showing the ramp engaged with a track system of a frame.

Referring now to FIGS. 2A-B, the frame 118 includes a front end 132, a rear end 134, and a track system 136. The rear end 134 of the frame 118 is spaced longitudinally apart from the front end 132, and the track system 136 extends longitudinally between the front end 132 and the rear end 134 of the frame 118. The track system 136 includes a first side 138, a second side 140, and a frame floor 142 extending between the first side 138 and the second side 140. In some embodiments, the frame floor 142 supports the ramp 120 as the ramp 120 is moved between the stowed position 124 and the lowered position 126.

In some embodiments, the conventional floor 112 of the vehicle 100 may be modified such that the rear end 134, the first side 138, and the second side 140 of the frame 118 are surrounded by the conventional floor 112 of the vehicle 100. In such an arrangement, the frame 118 is positioned below and fixed relative to the conventional floor 112 of the vehicle 100.

It should be understood that in the illustrative embodiment the first side 138 and the second side 140 of the track system 136 are a mirror image of one another and are otherwise identical such that the description of the track system 136 to follow applies equally to both the first side 138 and the second side 140 of the track system 136.

As suggested by FIG. 2B, the track system 136 includes a pair of wheels 143 and a conveyer belt 145. The pair of wheels 143 are spaced longitudinally apart from one another, and the conveyer belt 145 surrounds the pair of wheels 143. The pair of wheels 143 is positioned in a fixed location relative to the frame 118, and rotation of the pair of wheels 143 drives movement of the conveyer belt 145 around the pair of wheels 143 in a clockwise or counterclockwise direction. In the illustrative embodiment, the pair of wheels 143 is a pair of toothed wheels, and the conveyer belt 145 is a toothed belt. Engagement between teeth of the wheels and teeth of the belt allows the pair of wheels 143 to drive rotation of the conveyer belt 145. It should be appreciated that in other embodiments, the belt and wheels may be replaced with any suitable drive mechanism for advancing the drive block 152 as described below.

Referring still to FIG. 2B, the track system 136 of the frame 118 includes a first longitudinal channel 144, a second longitudinal channel 146, and a longitudinally-extending hanger track 148 each extending from the rear end 134 of the frame 118 toward the front end 132 (not shown). Each of the longitudinal channels 144, 146 and the longitudinally-extending hanger track 148 extend parallel to one another in the longitudinal direction shown by the double headed arrow 150. The longitudinal channels 144, 146 and the longitudinally-extending hanger track 148 are vertically-oriented relative to one another. As such, the first longitudinal channel 144 is positioned adjacent to the frame floor 142; the second longitudinal channel 146 is positioned directly above the first longitudinal channel 144; and, the longitudinally-extending hanger track 148 is positioned directly above the second longitudinal channel 146.

As suggested above, the linkage assembly 122 is coupled to the frame 118 and the ramp 120 to facilitate movement of the ramp 120 relative to the frame 118. As such, the linkage assembly 122 includes a plurality of rollers configured to translate along the frame 118, pivot relative to the frame 118, or facilitate rotation of other components of the ramp assembly 114 relative to the frame 118.

The linkage assembly 122 includes a drive block 152, a linkage arm 154, and a linkage panel 156. The drive block 152 is coupled to a first pair of drive-rollers 158 and a second pair of drive-rollers 160. Each drive-roller included in the first pair of drive-rollers 158 is configured to rotate about a rotational axis 162*a*, 162*b*. Each drive-roller included in the second pair of drive-rollers 160 is configured to rotate about a rotational axis 164*a*, 164*b*. The rotational axes 162*a*, 162*b* are parallel to one another; the rotational axes 164*a*, 164*b* are parallel to one another; and, the rotational axes 162*a*, 162*b* are perpendicular to the rotational axes 164*a*, 164*b*.

As shown in FIG. 2B, the first pair of drive-rollers 158 are positioned in the longitudinally-extending hanger track 148 and configured to translate longitudinally along the longitudinally-extending hanger track 148 to facilitate sliding movement of the ramp 120 relative to the frame 118. The second pair of drive-rollers 160 are positioned in (or in some embodiments adjacent to) the second longitudinal channel 146 to facilitate sliding movement of the ramp 120 relative to the frame 118. Further, the drive block 152 includes an attachment arm 166 fixedly coupled to the conveyer belt 145. As such, movement of the conveyer belt 145 around the pair of wheels 143 causes movement of the drive block 152, which, in turn, drives movement of the plurality of rollers and, thereby, the ramp 120.

As shown in FIG. 2B, the linkage arm 154 is coupled between the drive block 152 and the linkage panel 156. In the illustrative embodiment, the linkage arm 154 includes a first end 168 pivotably coupled to the drive block 152 and a second end 170 spaced apart from the first end 168. The linkage arm 154 defines a longitudinal axis 172 extending from the first end 168 to the second end 170 of the linkage arm 154.

The linkage panel 156 includes a first end 174 and a second end 176 spaced apart from the first end 174, and the linkage panel 156 defines a plane 177 extending through the first end 174 and the second end 176 of the linkage panel 156. When the ramp 120 is in the stowed position 124, the longitudinal axis 172 of the linkage arm 154 is contained in the plane 177 defined by the linkage panel 156.

In the illustrative embodiment, the first end 174 of the linkage panel 156 is pivotably coupled to the second end 170 of the linkage arm 154 for rotation about a first pivot axis 178 of the linkage panel 156. The second end 176 of the linkage panel 156 is pivotably coupled to the rear end 130 of the ramp 120. In the illustrative embodiment, a hinge 180 is coupled between the linkage panel 156 and the rear end 130 of the ramp 120 to facilitate pivoting movement of the ramp 120 relative to the linkage panel 156.

As shown in FIG. 2B, a lower roller 182 and an upper roller 184 are each pivotably coupled to the linkage panel 156. The lower roller 182 has a width 186 and is configured to rotate about the first pivot axis 178 of the linkage panel 156. The upper roller 184 has a second width 188 and is configured to rotate about a second pivot axis 190 of the linkage panel 156. The width 188 of the upper roller 184 is greater than the width 186 of the lower roller 182.

In the illustrative embodiment, the second pivot axis 190 of the linkage panel 156 is positioned between and spaced apart from the first end 174 and the second end 176 of the linkage panel 156. In some instances, as will be described in greater detail below, the upper roller 184 facilitates rotation of the linkage panel 156 about the second pivot axis 190. Because the second pivot axis 190 (and upper roller 184) is spaced apart from the second end 176 of the linkage panel 156, when the linkage panel 156 rotates about the second pivot axis 190, the second end 176 of the linkage panel 156 rotates above the upper roller 184. Rotation of the linkage panel 156 above the upper roller 184 pulls the rear end 130 of the ramp 120 to a higher position relative to the frame 118 to facilitate ease of movement of a wheel-chaired passenger to and from the interior 116 of the vehicle 100.

Figure 3A:
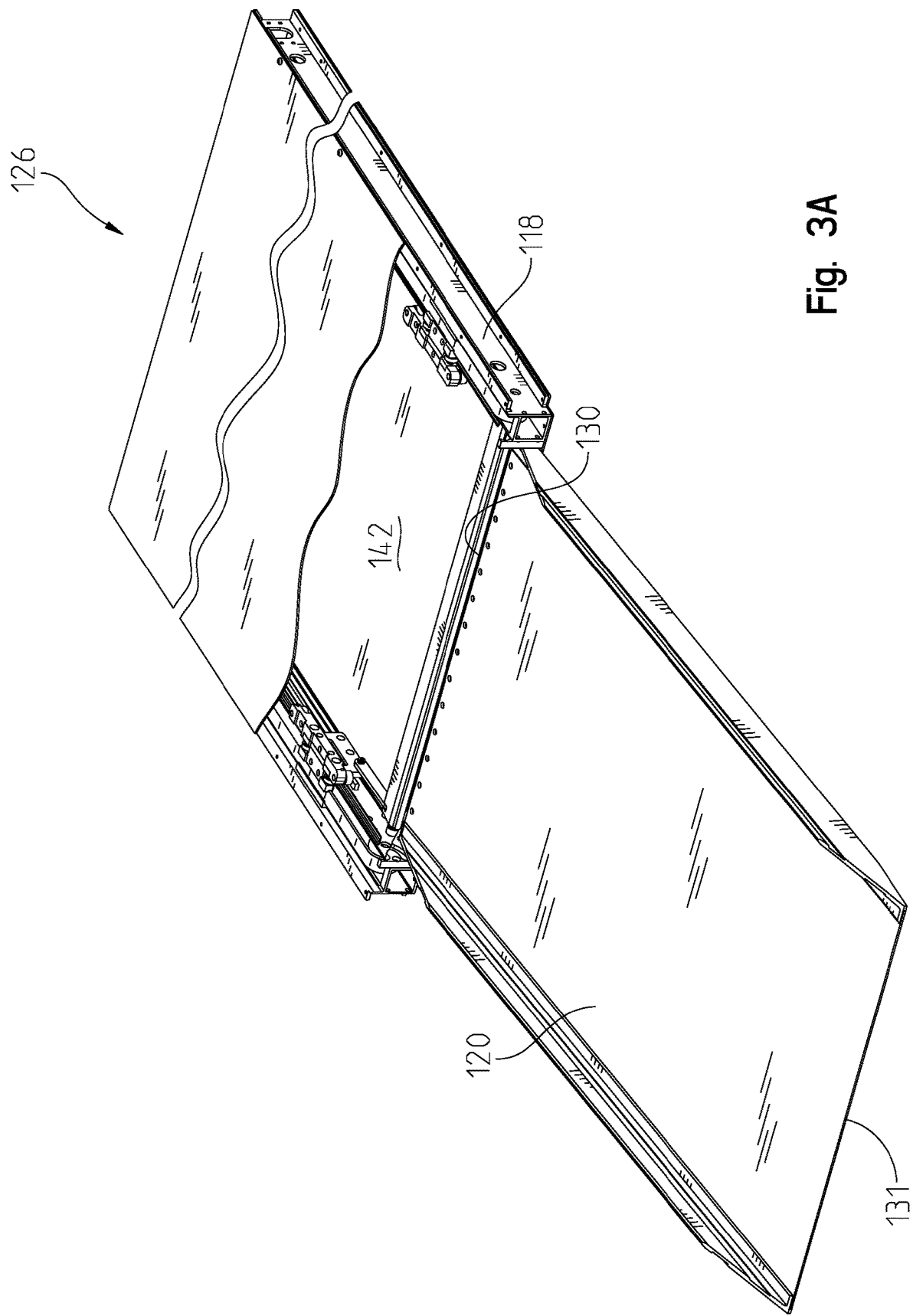
FIG. 3A is a perspective view of the ramp assembly of 2A showing the ramp in a lowered position below the conventional floor of the passenger vehicle.

Referring now to FIG. 3A, the ramp 120 is shown in the lowered position 126. When the ramp 120 is in the lowered position 126, the ramp 120 is deployed from the frame 118, the front end 131 of the ramp 120 is resting on the ground 108 (not shown), and the rear end 130 of the ramp 120 is resting on the frame floor 142. As such, in the lowered position 126, the rear end 130 of the ramp 120 is positioned below the level of the conventional floor 112 of the vehicle 100.

Referring now to FIG. 3B, the ramp 120 is again shown in the lowered position 126. When the ramp 120 is in the lowered position 126, the longitudinal axis 172 of the linkage arm 154 forms a non-orthogonal angle with the plane 177 defined by the linkage panel 156. In the illustrative embodiment, when the ramp 120 is in any position other than the raised position 128 (including but not limited to the stowed position 124 and the lowered position 126), the longitudinal axis 172 of the linkage arm 154 forms a non-orthogonal angle with the plane 177 defined by the linkage panel 156.

Figure 3B:
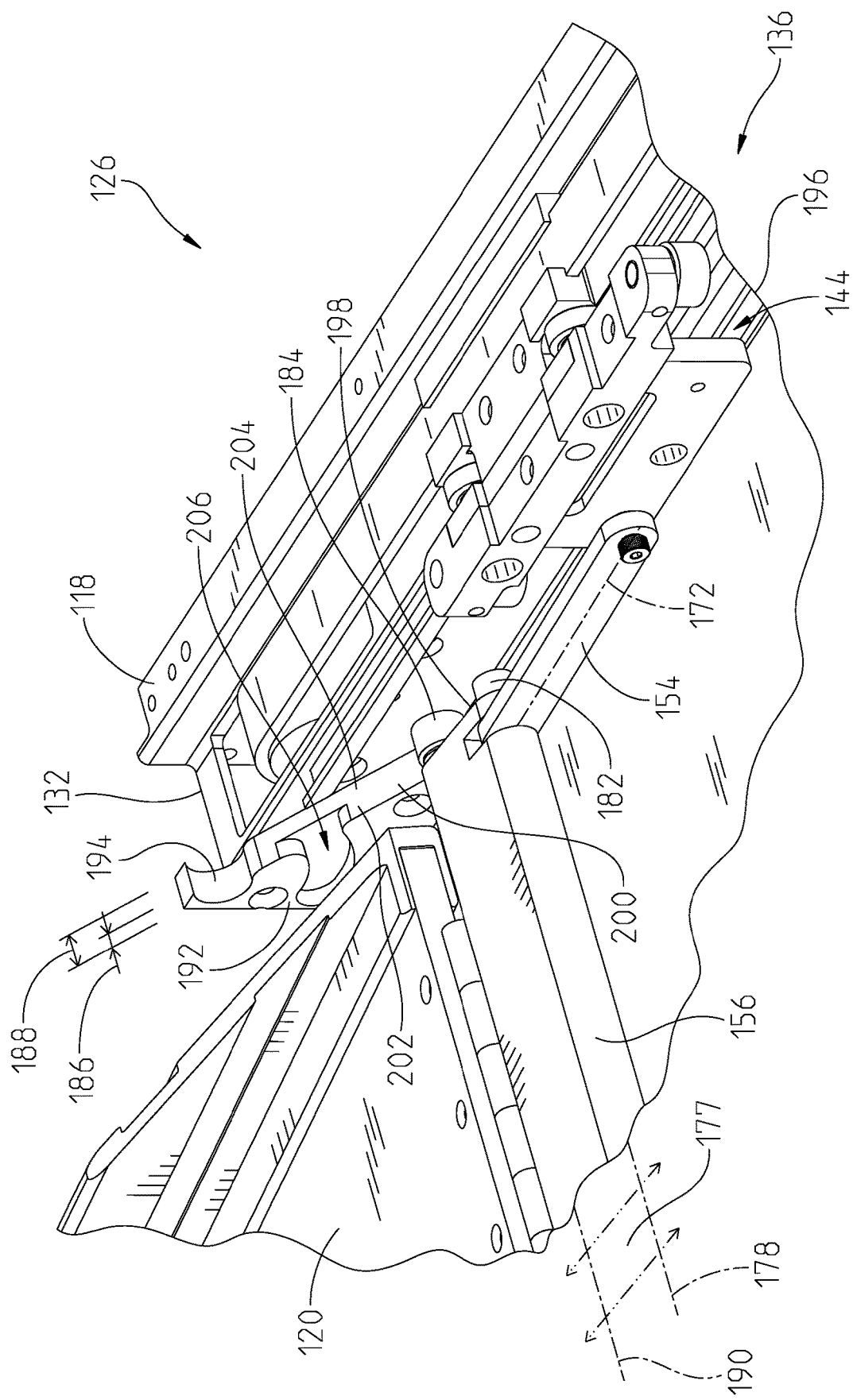
FIG. 3B is a perspective view of the ramp assembly of 3A showing an upper roller and a lower roller positioned in a longitudinal channel of the track system adjacent a guide block of the track system when the ramp is in the lowered position.

As suggested by FIG. 3B, the lower roller 182 and the upper roller 184 translate longitudinally along the track system 136 in the first longitudinal channel 144 to move the ramp 120 from the stowed position 124 to the lowered position 126. The track system 136 includes the first longitudinal channel 144, as discussed above, and the track system 136 includes a guide block 192 and a roller socket 194. Together, the first longitudinal channel 144, the guide block 192, and the roller socket 194 define a continuous portion of the track system 136 along which the upper roller 184 translates and/or pivots to move the ramp 120 between the stowed position 124, the lowered position 126, and the raised position 128.

The first longitudinal channel 144 of the track system 136 extends from a rear end 196 to a front end 198 of the channel 144, and the guide block 192 is defined at the front end 198 of the channel 144. The guide block 192 includes a sloped surface 200 that increases in height as it extends longitudinally away from the front end 198 of the first longitudinal channel 144. The sloped surface 200 includes a first portion 202 and a second portion 204. The first portion 202 is adjacent the ramp 120 when the ramp is in the lowered position 126, and the second portion 204 is adjacent to the first portion 202 and spaced apart from the ramp 120. A curved groove 206 is defined in the guide block 192 and opens through the first portion 202 of the sloped surface 200. Together, the first longitudinal channel 144, the first portion 202 of the sloped surface 200, and the curved groove 206 define a continuous portion of the track system 136 along which the lower roller 182 translates to move the ramp 120 between the stowed position 124, the lowered position 126, and the raised position 128.

As shown in FIG. 3B, the sloped surface 200 extends upwardly from the front end 198 of the first longitudinal channel 144 to the roller socket 194. The roller socket 194 is defined along the track system 136 at the front end 132 of the frame 118, and the roller socket 194 is configured to receive the upper roller 184. While the upper roller 184 is sized and shaped to seat in the roller socket 194, the upper roller 184 cannot enter the curve groove 206 defined in the guide block 192. In the illustrative embodiment, the width 188 of the upper roller 184 is greater than the width 184 of the lower roller 182. As such, when the rollers 182, 184 are advanced along the sloped surface 200, the upper roller 184 translates along the second portion 204 of the sloped surface 200 to pass over the curved groove 206, and the lower roller 182 translates along the first portion 202 of the sloped surface and enters the curved groove 206.

Figure 4:
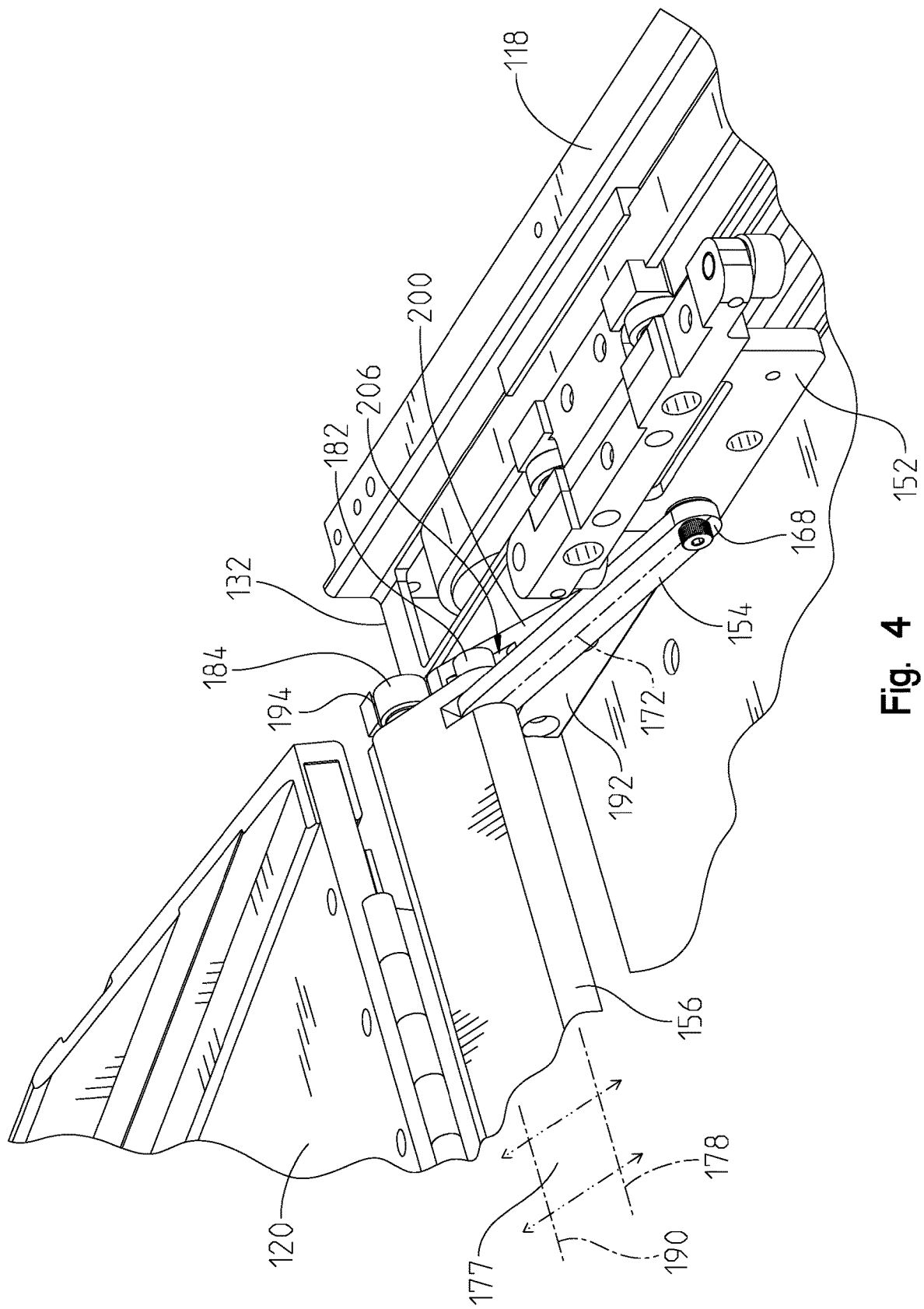
FIG. 4 is a perspective view of the ramp assembly showing the upper roller positioned in a roller socket of the guide block and the lower roller positioned along an inclined surface of the guide block when the ramp is positioned between the lowered position and a raised position.

Referring now to FIG. 4, the ramp 120 is illustratively shown between the lowered position 126 and the raised position 128. As the lower roller 182 and the upper roller 184 translate along the sloped surface 200 of the guide block 192, the linkage arm 154 pivots relative to the drive block 152 at the first end 168 of the linkage arm 154. When the upper roller 184 is seated in the roller socket 194 and the drive block 152 is advanced longitudinally toward the front end 132 of the frame 118, the linkage panel 156 pivots relative to the linkage arm 154 about the pivot axis 178. As such, the lower roller 182 swings into the curved groove 206 to facilitate rotation of the linkage panel 156 about the second pivot axis 190.

Figure 5A:
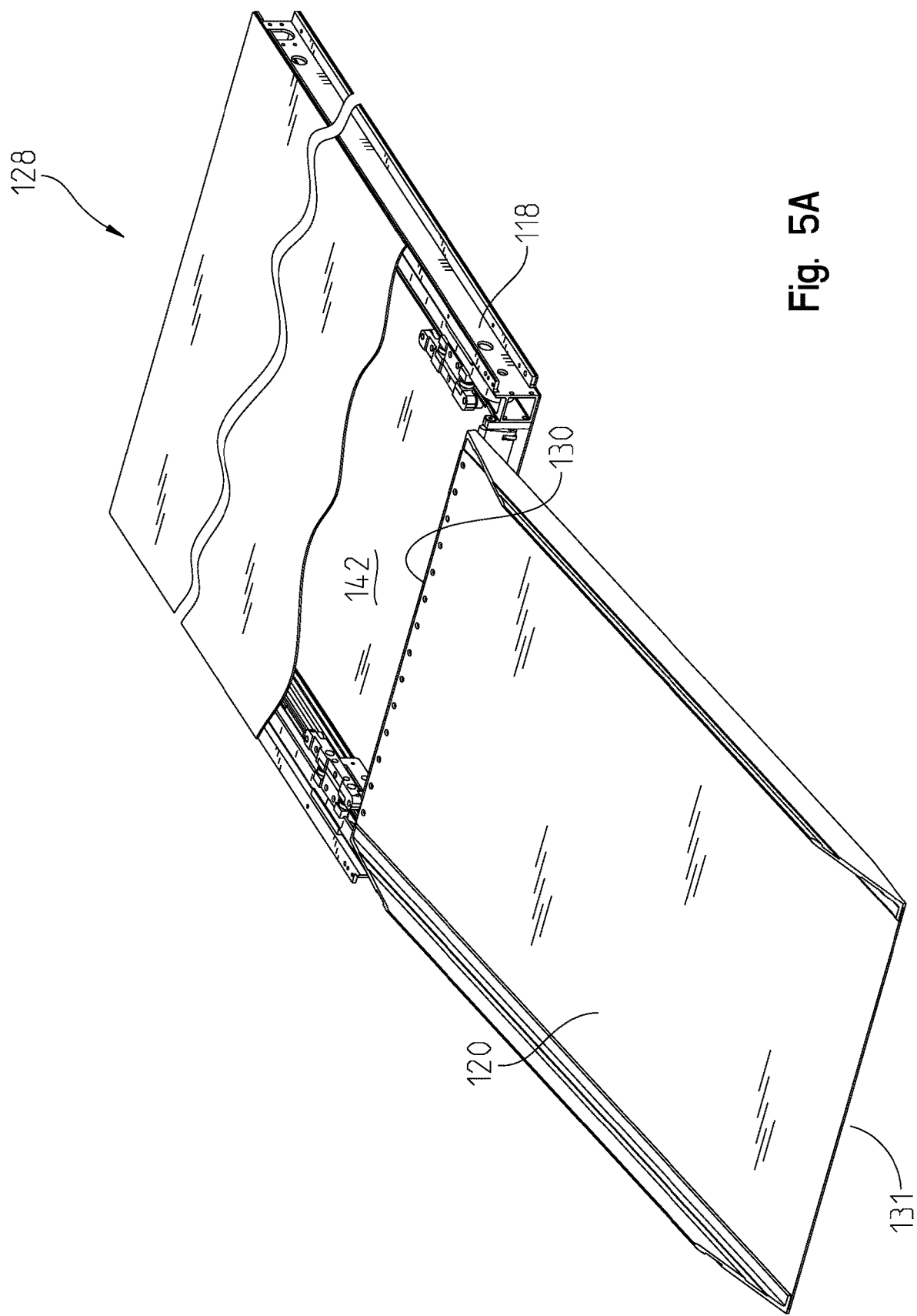
FIG. 5A is a perspective view of the ramp assembly of 2A showing the ramp in a raised position flush with the conventional floor of the passenger vehicle; and, FIG. 5B is a perspective view of the ramp assembly of 5A showing the upper roller positioned in the roller socket of the guide block and the lower roller positioned in a curved groove of the guide block when the ramp is in the raised position.

Referring now to FIG. 5A, the ramp 120 is shown in the raised position 128. When the ramp 120 is in the raised position 128, the ramp 120 is deployed from the frame 118, the front end 131 of the ramp 120 is resting on the ground 108 (not shown), and the rear end 130 of the ramp 120 is spaced apart from the frame floor 142. As such, in the raised position 128, the rear end 130 of the ramp 120 is flush with the conventional floor 112 of the motorized vehicle 100 to facilitate ease of entry and exit of a wheel-chaired passenger from the motorized vehicle 100.

Figure 5B:
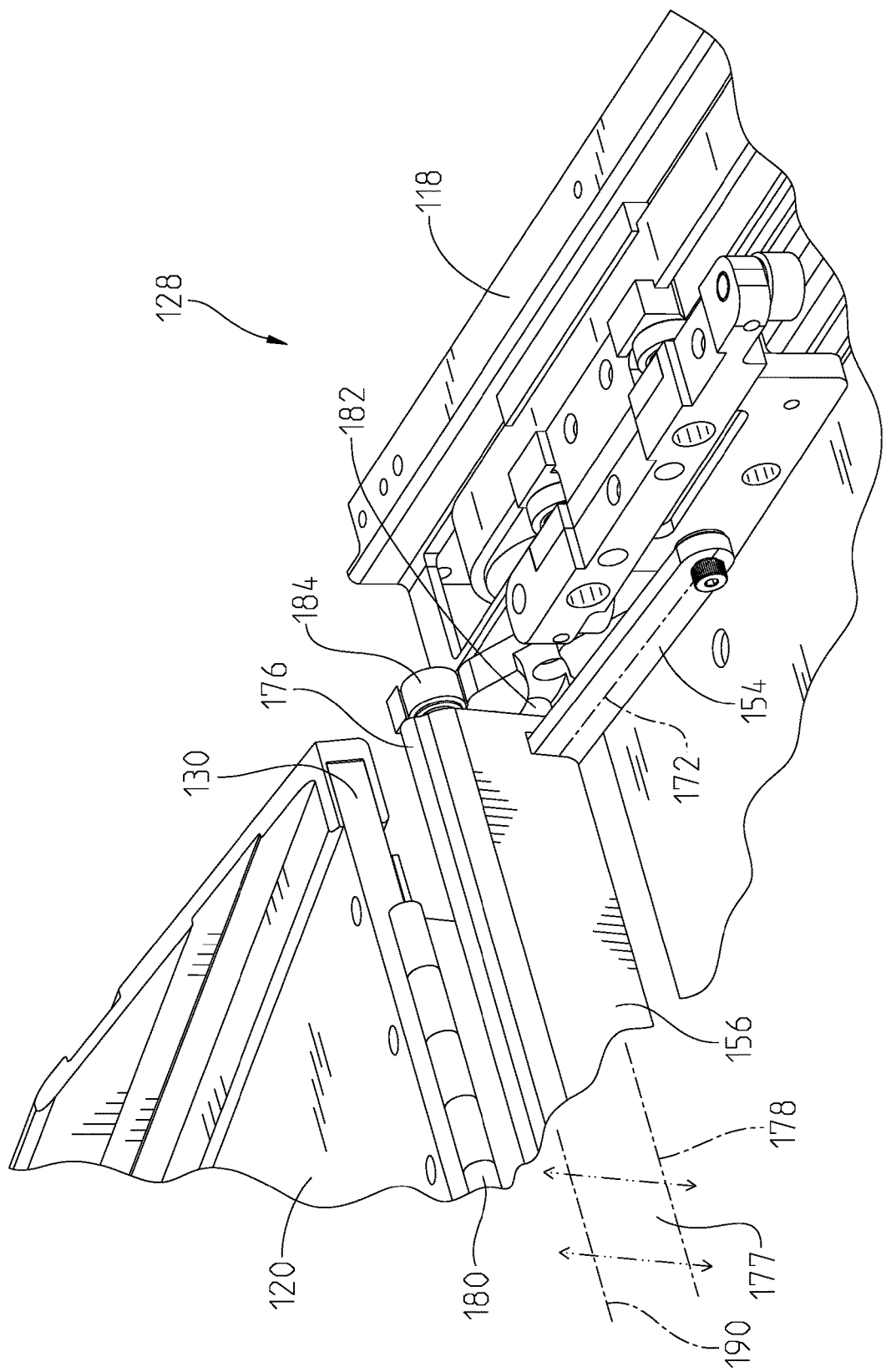

Referring now to FIG. 5B, the ramp 120 is again shown in the raised position 128. In the illustrative embodiment, when the ramp 120 is in the raised position 128, the longitudinal axis 172 of the linkage arm is substantially perpendicular or orthogonal to the plane 177 defined by the linkage panel 156. The linkage panel 156 is pivotably coupled to the ramp 120. For example, as shown in FIG. 5B, the second end 176 of the linkage panel 156 is coupled to the rear end 130 of the ramp 120 by the hinge 180. As such, when the second end 176 of the linkage panel 156 rotates above the upper roller 184, the rear end 130 of the ramp 120 is positioned flush with the conventional floor 112 of the motorized vehicle 100.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this disclosure pertains and which fall within the limits of the appended claims.

The invention claimed is:

1. A ramp assembly to accommodate a wheelchaired passenger to enter or exit a motorized vehicle, comprising:
    a frame having a front end and a rear end;
    a ramp moveable between a stowed position and a deployed position, wherein in the stowed position the ramp is disposed between the front end and the rear end and in the deployed position the ramp extends away from the front end;
    a driver configured to translate longitudinally along a length of the ramp assembly, in a first direction toward the rear end and in a second direction toward the front end, to move the ramp between the stowed position and the deployed position; and,
    a link coupled between the driver and the ramp, the link having a first pivotal connection permitting the link to pivot relative to the driver, a second pivotal connection permitting the link to pivot relative to the ramp, and a pivot axis disposed between the first pivotal connection and the second pivotal connection, wherein the link is configured to rotate about the pivot axis relative to the frame as the driver translates longitudinally to elevate the second pivotal connection and, thereby, a rear edge of the ramp relative to the frame.

2. The ramp assembly of claim 1 further comprising a second link coupling the link to the driver, wherein the second link is connected at a first end to the link by the first pivotal connection and is pivotally connected at a second end about the driver.

3. The ramp assembly of claim 2, wherein the second link is orthogonal to the first link when the ramp is in the deployed position and is non-orthogonal to the first link when the ramp is in the stowed position.

4. The ramp assembly of claim 2, wherein: the ramp has an intermediate position between the stowed position and the deployed position; the link translates longitudinally with the driver relative to the frame as the ramp is moved between the stowed position and the intermediate position; and the link rotates about the pivot axis relative to the frame as the driver continues to translate longitudinally to move the ramp between the intermediate position and the deployed position.

5. The ramp assembly of claim 4, wherein the pivot axis of the link is stationary relative to the frame while the ramp is moved between the intermediate position and the deployed position.

6. The ramp assembly of claim 5 further comprising: a pivot member coupled to the link at the pivot axis; and a socket configured to receive the pivot member as the ramp enters the intermediate position from the stowed position and to hold the pivot member as the ramp moves between the intermediate position and the deployed position.

7. The ramp assembly of claim 6, wherein the pivot member is a roller.

8. The ramp assembly of claim 7, further comprising a sloped surface increasing in height and terminating in the socket in the second direction, wherein the roller traverses the sloped surface as it moves toward the socket.

9. The ramp assembly of claim 6, further comprising: a second pivot member coupled to the first pivotal connection; and, a downwardly directed curved surface configured to receive the second pivot member as the ramp enters the intermediate position from the stowed position, wherein the second pivot member traverses a length of the curved surface as the ramp moved from the intermediate position to the deployed position.

10. The ramp assembly of claim 2, wherein in the deployed position, the first pivotal connection, the second pivotal connection, and the pivot axis are aligned orthogonal to a longitudinal axis of the frame.

11. The ramp assembly of claim 10, wherein in the stowed position, the first pivotal connection, the second pivotal connection and the pivot axis are aligned generally parallel to the longitudinal axis.

12. A ramp assembly to accommodate a wheelchaired passenger to enter or exit a motorized vehicle, comprising:
    a frame having a front end and a rear end;
    a ramp moveable between a stowed position, an intermediate position, and a deployed position, the intermediate position being between the stowed position and the deployed position, wherein in the stowed position the ramp is disposed between the front end and the rear end and in the deployed position the ramp extends away from the front end;
    a driver configured to translate longitudinally along a length of the ramp assembly, in a first direction toward the rear end and in a second direction toward the front end, to move the ramp between the stowed position and the deployed position; and,
    a link coupled between the driver and the ramp, the link having a first pivotal connection permitting the link to pivot relative to the driver, a second pivotal connection permitting the link to pivot relative to the ramp, wherein:
        the link translates longitudinally with the driver relative to the frame as the ramp is moved between the stowed position and the intermediate position; and,
        the link rotates as the driver continues to translate longitudinally to move the ramp between the intermediate position and the deployed position, whereby a rear edge of the ramp is elevated relative to the frame in the deployed position.

13. The ramp assembly of claim 12, wherein the link is disposed generally parallel to a longitudinal axis of the frame between the stowed position and the intermediate position.

14. The ramp assembly of claim 13, wherein the link is disposed generally orthogonal to the longitudinal axis in the deployed position.

15. The ramp assembly of claim 12, wherein the link is configured to rotate about a rotational axis, the rotational axis being stationary relative to the frame as the ramp moves between the intermediate position and the deployed position.

16. The ramp assembly of claim 15, wherein the rotational axis is disposed between the first pivotal connection and the second pivotal connection.

17. A ramp assembly to accommodate a wheelchaired passenger to enter or exit a motorized vehicle, comprising:
    a frame having a front end and a rear end;
    a ramp moveable between a stowed position and a deployed position, wherein in the stowed position the ramp is disposed between the front end and the rear end and in the deployed position the ramp extends away from the front end;
    a driver configured to translate longitudinally along a length of the ramp assembly, in a first direction toward the rear end and in a second direction toward the front end, to move the ramp between the stowed position and the deployed position; and, a link coupled between the driver and the ramp, the link having a first pivotal connection permitting the link to pivot relative to the driver, a second pivotal connection permitting the link to pivot relative to the ramp, and a pivot axis disposed between the first pivotal connection and the second pivotal connection, wherein:

the link translates longitudinally with the driver relative to the frame as the ramp is moved between the stowed position and an intermediate position; and, the pivot axis remains stationary and the link rotates about the pivot axis as the driver continues to translate longitudinally to move the ramp between the intermediate position and the deployed position, whereby a rear edge of the ramp is elevated relative to the frame in the deployed position.

18. The ramp assembly of claim 17, wherein the link is disposed generally orthogonal to the longitudinal axis in the deployed position and generally parallel to a longitudinal axis of the frame between the stowed position and the intermediate position.

19. The ramp assembly of claim 17 further comprising:

a first roller coupled to the link for rotation about the pivot axis;

a socket configured to receive the first roller as the ramp enters the intermediate position from the stowed position and to hold the first roller as the ramp moves between the intermediate position and the deployed position;

a second roller coupled to the link for rotation about an axis of the first pivotal connection; and, a downwardly directed curved surface configured to receive the second roller as the ramp enters the intermediate position from the stowed position, wherein the second roller traverses a length of the curved surface as the ramp moved from the intermediate position to the deployed position.

20. The ramp assembly of claim 17, wherein the second pivotal connection is disposed above the pivot axis when the ramp is in the deployed position.

* * * * *